(12) United States Patent
Lettieri et al.

(10) Patent No.: US 10,503,488 B2
(45) Date of Patent: Dec. 10, 2019

(54) UPDATING A PAYMENT PROCESSING SYSTEM TO CONFORM WITH A STANDARD

(71) Applicant: NCR Corporation, Duluth, GA (US)

(72) Inventors: Francesco Maria Lettieri, London (GB); Mervin Amos, London (GB); Monish Meiappan, Croydon (GB)

(73) Assignee: NCR Corporation, Atlanta, GA (US)

( * ) Notice: Subject to any disclaimer, the term of this patent is extended or adjusted under 35 U.S.C. 154(b) by 422 days.

(21) Appl. No.: 15/490,302

(22) Filed: Apr. 18, 2017

(65) Prior Publication Data

US 2018/0300695 A1 Oct. 18, 2018

(51) Int. Cl.
*G06F 8/65* (2018.01)
*G06Q 20/10* (2012.01)
*G06F 16/23* (2019.01)
*G06Q 20/08* (2012.01)
*H04L 29/08* (2006.01)
*G07F 7/08* (2006.01)

(52) U.S. Cl.
CPC .............. *G06F 8/65* (2013.01); *G06F 16/23* (2019.01); *G06Q 20/08* (2013.01); *G06Q 20/10* (2013.01); *G07F 7/0873* (2013.01); *H04L 67/34* (2013.01)

(58) Field of Classification Search
CPC ........... G06F 8/65; G06F 16/23; G06Q 20/08; G06Q 20/10; G07F 7/0873; H04L 67/34
USPC .......... 717/168–173; 705/17, 40, 53, 77, 79, 705/910
See application file for complete search history.

(56) References Cited

U.S. PATENT DOCUMENTS

| | | | |
|---|---|---|---|
| 8,683,455 B1 * | 3/2014 | Tallam .................. | G06F 8/4435 717/106 |
| 2005/0075977 A1 * | 4/2005 | Carroll ................ | G06Q 20/102 705/40 |
| 2017/0004506 A1 * | 1/2017 | Steinman ........... | G06Q 20/4014 |
| 2017/0221044 A1 * | 8/2017 | Zhong ................ | G06Q 20/3278 |
| 2018/0174210 A1 * | 6/2018 | Williams ............... | G06Q 30/04 |
| 2018/0197171 A1 * | 7/2018 | Steinman ............. | G06Q 20/227 |

* cited by examiner

*Primary Examiner* — Qing Chen
(74) *Attorney, Agent, or Firm* — Schwegman, Lundberg & Woessner

(57) ABSTRACT

Examples of a system and method for updating a payment processing system to conform with a standard are generally described. A method may include generating an update code configured to replace or be inserted into an executable code file. The method may include sending the update code to a payment processing system for implementation in the payment processing system. The update code may include validation code or mapping code. The payment processing system may include validation rules or mapping rules.

16 Claims, 9 Drawing Sheets

UPDATING A PAYMENT PROCESSING SYSTEM TO CONFORM WITH A STANDARD

BACKGROUND

A payment processing system is used to accept payments (e.g., from a consumer) and send the payments to a payment acceptance system (e.g., credit card company) for further processing. For example, the payment processing system may include an electronic funds transfer (ETF) system for accepting payments at vendors, devices, websites, etc. Periodically, payment acceptance systems will update configuration of how payments are to be sent/received. An updated configuration file may be sent from a payment processing update system that coordinates between the payment processing system and the payment acceptance system. One issue with sending a configuration file to update the system is that it does not readily meet the requirements of sending updates to a customer who already has an installed interface or applied local mapping changes.

SUMMARY

In various embodiments, methods and systems for updating a payment system to conform with a standard are presented.

According to an embodiment, a method may include generating an update code including validation code or mapping code to validate or map a financial transaction message, the update code configured to replace an executable code file. The method may include sending the update code in a configuration code file to a payment processing system for implementation in the payment processing system. The payment processing system may include a database with a validation rule or a mapping rule, the validation code or the mapping code configured to be overridden by the validation rule or the mapping rule, respectively.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
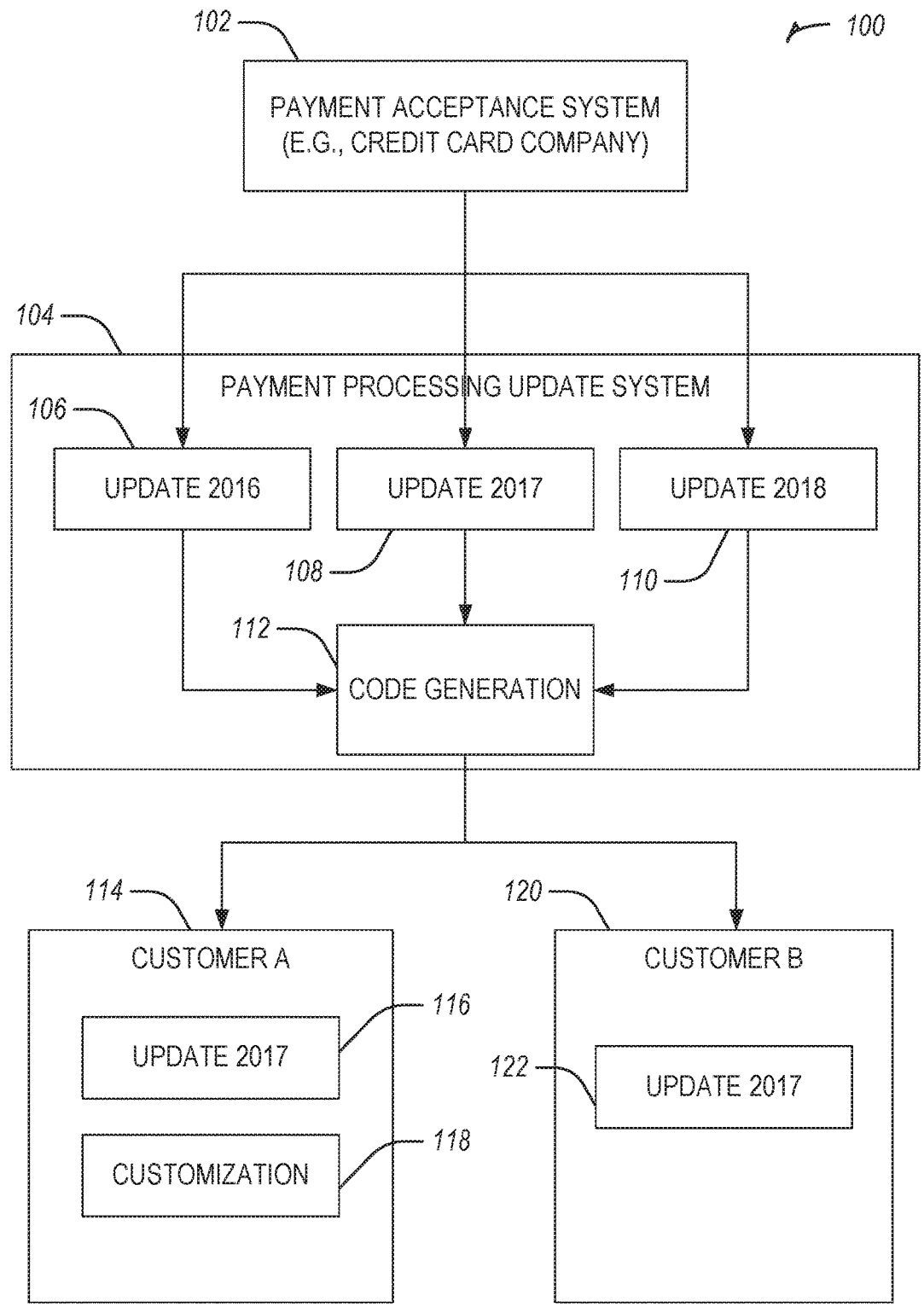
FIG. 1 illustrates generally a block diagram for updating configuration files in accordance with some embodiments.

The systems and methods described herein provide code for updating a data structure of a parsed message within a payment processing system. The code is sent to a payment processing system for communicating with a payment acceptance service (e.g., a credit card company) using updated message configuration settings (e.g., with updated data parameters or an updated data structure). The code is sent to the payment processing system rather than sending an updated configuration file itself such that customized mapping configured at the payment processing system may be retained while updating the message configuration settings (e.g., the customizations are not overwritten).

Systems and methods described herein may include updating a configuration data structure to confirm with a standard (e.g., a standard supplied by a payment acceptance system, such as a credit card company). In an example, information related to an interface definition, mapping rules, or validation rules may be used to generate update code which may be loaded during processing. The update code may be used to update the payment processing system. The update code may be delivered to a customer (e.g., a payment processing system), tracked in version control customized, or extended. The update code may be integrated with an existing way of customizing the processing (e.g., to prevent overwriting customizations at the payment processing system created by the customer). The systems and methods described herein may deliver standard product code with minimal impact to existing user configuration, allow a user of the payment processing system to override mapping rules, reduce complexity of updates (e.g., minimize SQL update complexities), or the like. In an example, the systems and methods described herein may deliver code without configured mapping rules (e.g., if the code is too complex to integrate or to update existing rules).

The systems and methods described herein may use a configuration to generate code from the configuration. The code may then be transported to a payment processing system (e.g., by a payment processing update system) rather than sending the configuration itself. Using a configuration to generate code allows for give greater customization and control. For example, the code may include a standard that, for example, sophisticated customers, may amend, change, or add on to with greater flexibility than if only a configuration itself was sent.

For example, a payment processing system may communicate with a payment acceptance system (e.g., a credit card company), then twice a year, the credit card company may change requirements for charging communications (e.g., processing a payment). A payment processing update system may send a configuration file to the payment processing system with these changes, but the configuration file may be cumbersome to send, receive, or customize. Instead, the payment processing update system may send an update code that, when executed, compiles to, amend, change, or overwrite the message configuration settings rather than sending the configuration file itself.

The systems and methods described herein allow unsophisticated customers or customers not wishing to customize a payment processing system code files to retain the benefit of preconfigured code to include updated message configuration settings. For example, the customers not wishing to customize the code may simply execute the updated code and use the message configuration settings that results. This simultaneously allows sophisticated customers that wish to customize the message configuration settings to modify the code. Either way, the code may be sent out to all customers without the need to check which type of customer is receiving the configuration information. In an example, the code may include a library such that customers may consult the library to keep preexisting customizations without introducing errors into the message configuration settings. Changes made by a customer only affects the payment processing system of that customer, and thus keeps other payment processing systems from being burdened by changes to message configuration settings that may have previously been introduced. This process may also reduce the burden on a payment processing update system in cases where specific configuration customizations were stored for particular customers FIG. 1 illustrates generally a block diagram 100 for updating message configuration settings in accordance with some embodiments. The block diagram 100 includes a payment acceptance system 102 (e.g., a credit card company or payment acceptance company). The payment acceptance system 102 may send one or more updates (e.g., update 2016 106, update 2017 108, or update 2018 110). The updates may be sent to a payment processing update system 104. The payment processing update system 104 may receive the updates and implement a code generation at block 112. The code generation 112 may include a generating code for a message configuration settings. The code may be sent to customers, for example customer A 114 or customer B 120. A recent update (e.g., update 2017 108) may be implemented in the code. In an example, customer A 114 runs the update 2017 116 and a customization 118, while customer B 120 includes only the update 2017 122. The code sent by the payment processing update system 104 may allow both customers to update (e.g., to the update 2017 configuration) and permit the customization 118 of customer A 114 to be retained and not overwritten.

In an example, the generated code may be moved internally within the update system 104 (e.g., from one server to another server), for example. This may allow for easier replication or distribution to customers or for convenience of using multiple versions. While the generated code may be moved, a package exporter for a configuration file may not be moved as easily, since the package exporter may be database dependent. This limitation or server movement when sending a configuration file itself may prevent access to customers or cause increased computing costs (e.g., server time, server load, processing power) at the payment processing update system 104.

Figure 2:
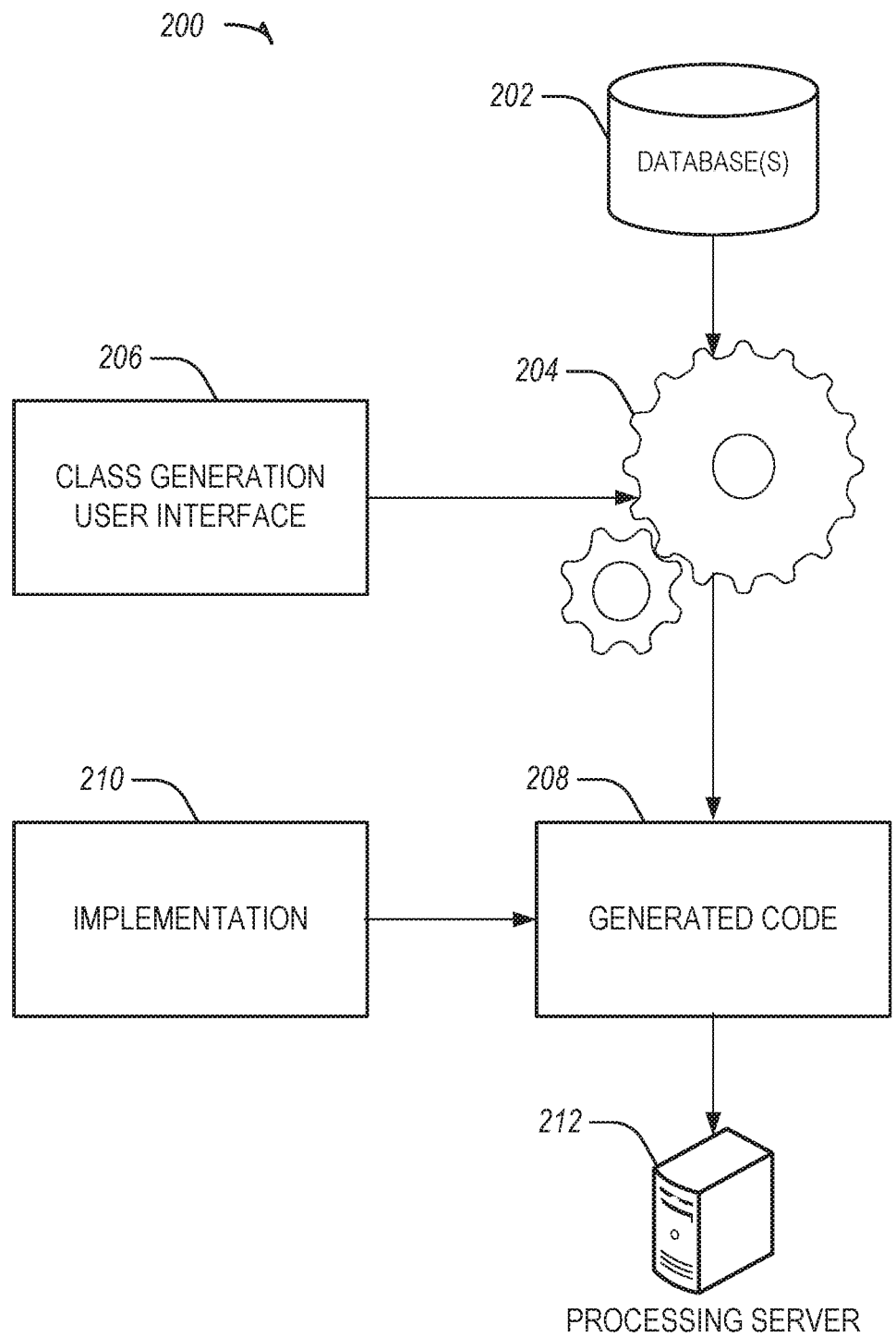
FIG. 2 illustrates generally a diagram including an interface code generator for code flow in accordance with some embodiments.

FIG. 2 illustrates generally a diagram 200 including an interface code generator for code flow in accordance with some embodiments. The diagram 200 includes a database 202 in communication with a code generator 204. The database 202 may include mapping rules, interfaces, or messages. The code generator 204 may draw aspects saved in the database 202 or receive information from a class generation user interface 206. The class generation user interface 206 may be used to receive a user selection, such as an applicable standard update. The code generator 204 may generate code related to a message configuration setting, such as based on the standard update or the information from the database 202. The code generator 204 may send the generated code to block 208. Block 208 may dynamically load implementation code from block 210 to include custom message configuration settings for a particular customer. The implementation code may override the update code to retain customer-specific customizations. The generated code may then be executed, such as via a post mapping action on a processing server 212.

Figure 3:
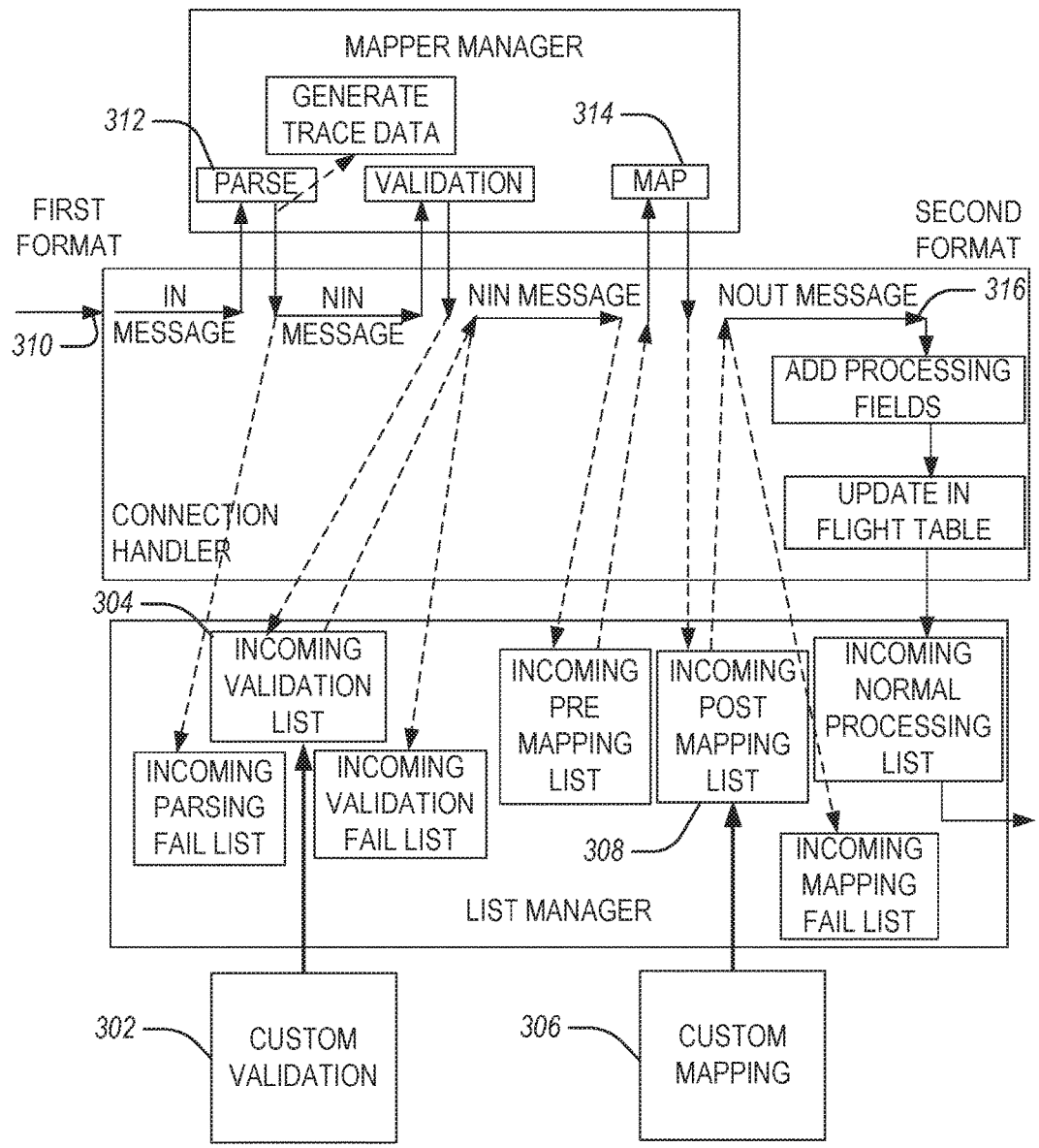
FIG. 3 illustrates generally a transaction processing code flow map in accordance with some embodiments.

FIG. 3 illustrates generally a transaction processing code flow map 300 in accordance with some embodiments. The arrows depicted with a solid line in FIG. 3 are normal processing actions and the arrows depicted with a dotted line are optional, additional custom processing. The transaction processing code flow 300 illustrates generally timing for adding a custom validation 302 and a custom mapping 306 to the process of processing messages. For example, the custom validation 302 is performed at the incoming validation list 304 process, for example after validation and before mapping. The custom mapping 306 is performed at the incoming post mapping list 308, for example after mapping and before adding processing fields. The transaction processing code flow 300 illustrates that a financial transaction message may be received at arrow 310 in a first format (e.g., from a payment acceptance system). The first format may include a raw data format. The data in the first format may be parsed 312 to create a message with the standard update in a second format. After parsing 312, the file in the second format may have custom validation 302 added, be mapped 314 and have custom mapping 306 added. The file may be output at 316 in the second format, by adding processing fields, making use of a flight table (e.g., a transaction cache), and processing the file for output.

The financial transaction message may include a backstream of raw data (e.g., from a credit card company), which may be transformed from the raw data to the second format that is readable by an application of the transaction processing code flow 300. The parsing 312 may include extracting elements from the raw data, such as credit card number, expiration date, name, etc. Then validation and mapping 314 may occur. In an example, mapping 314 includes taking the raw external data format and turning it into a raw internal form (e.g., a second format). The mapping 314 allows the transaction processing code flow 300 to receive data from a plurality of devices and still interpret the data. For example, the raw data may come from an automated teller machine (ATM), a self-service terminal (SST), a point of sale (POS) device, a credit card network, a credit card reader, etc. While byte streams may vary, the content may be the same or very similar. By parsing and validating, the transaction processing code flow 300 may be used with any of those sources.

Figure 4:
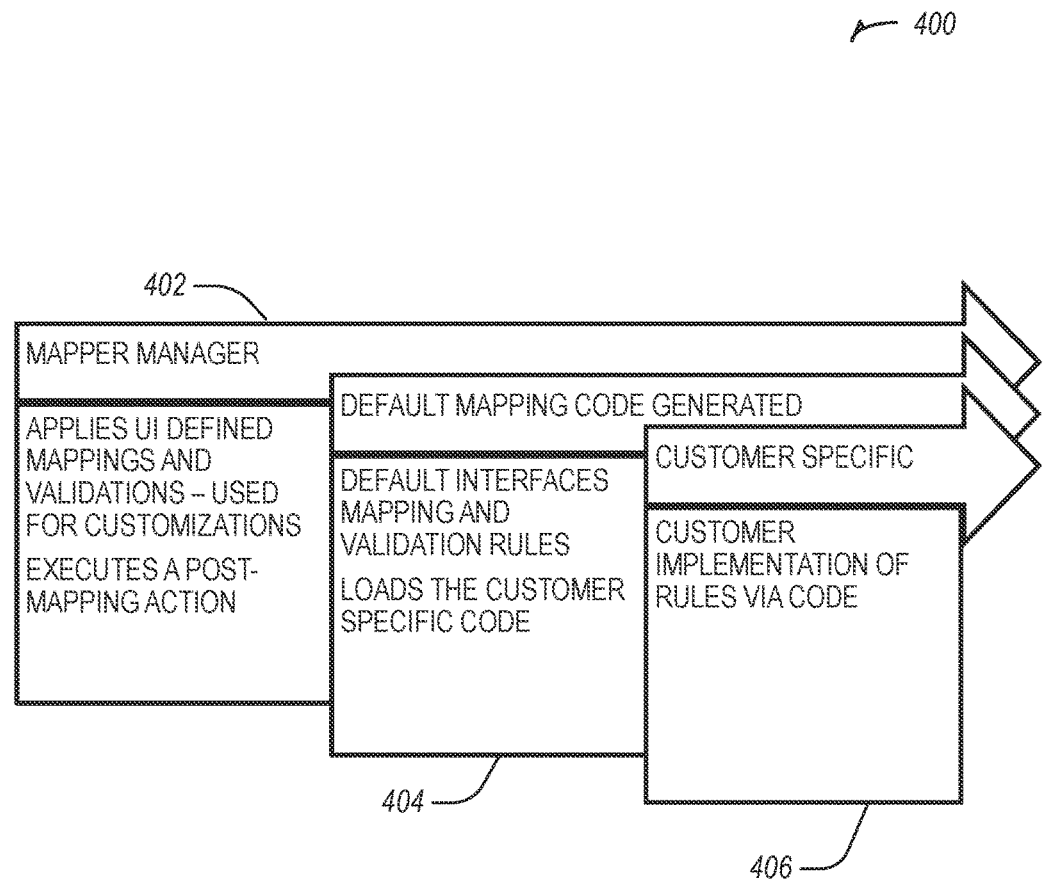
FIG. 4 illustrates generally a mapping rules hierarchy in accordance with some embodiments.

FIG. 4 illustrates generally a mapping rules hierarchy 400 in accordance with some embodiments. The code hierarchy 400 includes a mapper manager 402, a default mapping code 404, and customer specific code 406. The mapper manager 402 applies mappings and validations received, for example, via a user interface that may be used for customizations. The mapper manager 402 may execute a post-mapping action. The default mapping code 404 may be generated with default interfaces, mapping, or validation rules. The default mapping code 404 may load customer specific code. The customer specific code 406 may include a customer implementation of rules via code.

The code hierarchy 400 provides the ability of a payment processing update system to meet a standard while allowing customization or allowing a customer to overwrite the customization. During an update, the code hierarchy 400 provides for an update code to be sent that includes new customizations (e.g., directed to a standard update), and customers may integrate the update code without impacting the changes the customer has already made (e.g., at customer specific code 406). The customer may keep preferences, while allowing the update code to change the underlying standards. The code hierarchy 400 provides a way for customers to keep preferences while continuing to accept standards updates. The code hierarchy 400 allows a customer to not need to redo preferences or customizations each time the standard is updated, which may be required without the code hierarchy 400 (e.g., if a configuration file itself was sent to the customer rather than the update code).

The mapping rules configured in a database described in the code hierarchy 400 at the mapper manager 402 may be applied first. In a post-mapping action, the rules defined via code may be applied for values which are still null (e.g., using the default mapping code 404). In an example, when a value is already mapped for a particular message, the mapping manager 402 may avoid applying an additional mapping rule via code. In another example, a value may be explicitly set to null, such as with a flag to prevent overwriting. The final rules may be the customer specific code 406 rules.

Figure 5:
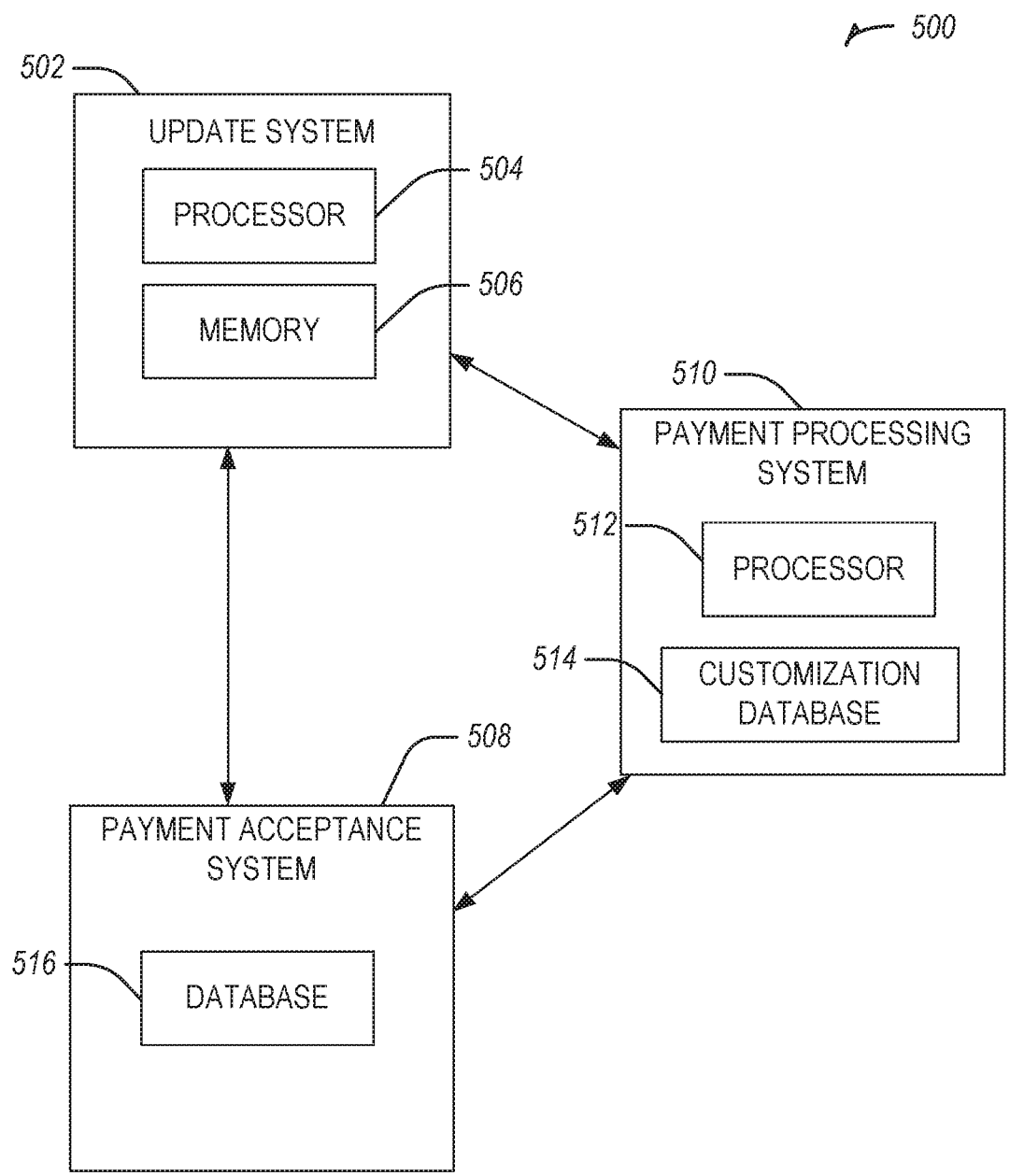
FIG. 5 illustrates generally a payment processing update system for updating a payment system to conform with a standard in accordance with some embodiments.

FIG. 5 illustrates generally a system 500 for updating a payment system to conform with a standard in accordance with some embodiments. The system 500 includes an update system including at least one processor 504 and memory 506. The memory 506 may comprise instructions, which when executed on the at least one processor, configure the at least one processor to perform operations as detailed herein. The update system 502 may be in communication with a payment acceptance system 508 and a payment processing system 510. The payment acceptance system 508 may include a database 516, which may store a standard update to be sent to the update system 502.

The payment processing system 510 may include a processor 512 to execute code, for example update code sent from the update system 502. The payment processing system 510 may include a customization database 514 to store configuration customizations, for example, customizations that are specific to the payment processing system 510 (e.g., not originated or applied via the update system 502 or the payment acceptance system 508). The payment processing system 510 may communicate with the payment acceptance system 508. For example the payment processing system 510 may send a financial transaction message to the payment acceptance system 508 to process a transaction. The financial transaction message may be formatted according to code run on the payment processing system 510 updated by the update system 502.

In an example, the processor 504 may receive a standard update, for example, from the payment acceptance system 508. The processor 504 may generate, using information from the standard update, an update code. The update code may be configured to be insertable into an executable code file (e.g., to be run on the payment processing system 510), the update code replacing a previous version of a standard corresponding to the standard update in the executable code file. The processor 504 may send the update code in a configuration code file to the payment processing system 510 for implementation in the payment processing system 510, the payment processing system 510 may include the executable code file.

In an example, the update code may include validation code or mapping code, which may be used to validate or map a financial transaction message (e.g., after parsing the message). In an example, the customization database 514 may include customized validation rules or mapping rules that may override the validation code or mapping code (respectively) of the update code. The validation code may, when executed (e.g., by the payment processing system 510), cause a system to determine whether a parsed message includes valid field values. The mapping code may, when executed (e.g., by the payment processing system 510), cause a system to convert field values from a message (e.g., a parsed message), to mapped values.

The update code may be configured to run automatically on the payment processing system The update code may be changed at the payment processing system 510 to include customizations prior to running on the payment processing system 510. In an example, the processor 504 may receive the standard update from the payment acceptance system, 508 and the update code may allow the payment processing system. 510 to send a payment in an updated configuration to the payment acceptance system, 508.

The system 500 may include a package structure to organize code, for example including interface code, mapping code, message code, or validation code. For example, a package structure may include classes organized as detailed below. An interfaces folder may include a java interface for each of the possible mappings defined in a payment processing system or one java class implementing all the interfaces. In an example, each interface may have several default methods, such as one for each field defined in the message. The customer may extend this class to customize the behavior of the mapping. In an example, an initialization code may be used to load mapping code. The mapping code may be used to load the customer specific code. The mapping folder may include a java class for each target interface. In an example, the mapping code, implementing the interfaces, may be put in the 'mapping.impl' folder. The messages folder may include a java class to define a super interface for each of the possible messages defined in the interface. In an example, a java class may be used as accessor for the message specific fields. The validation folder may store the source interface, which may include a folder containing the interfaces which may be implemented to customize the validation. The validation folder may include a subfolder called 'validator' to provide the code to load dynamically the customer implemented code for validation. The code loaded dynamically may be located under 'validation.impl'.

Example code to implement the systems and methods described herein is included below.

TABLE 1

The AuthenticToStandard70AbstractImplementor implements mapping interfaces for the source/target message pairs defined.

```
public abstract class
AuthenticToStandard70AbstractImplementor implements
AuthorisationResponse1110ToAuthorisationResponse,
ReversalRequest14001401ToAuthorisationRequest,
AuthorisationRequest11001101ToAuthorisationRequest {
    public void initialize(Map<Object, Object> sharedMap,
AuthenticMessage src, Standard70Message dst) {
    }
    public String mapToMessageType(Map<Object, Object>
sharedMap, AuthenticToStandard70.Operation op,
Standard70MessageFields mappingToField, AuthenticMessage
src, Standard70Message dst) throws MappingException {
        switch(op.getSourceType( )) {
            case ReversalRequest14001401:
            try {
                return (String) Mapping.transform("25");
            }
            catch (Exception e) {
                throw new MappingException("An error occurred
```

TABLE 1-continued

The AuthenticToStandard70AbstractImplementor implements mapping interfaces for the source/target message pairs defined.

```
            mapping the field "'+mappingToField.extName+'" .", e);
        }
        case AuthorisationRequest11001101:
        try {
            return (String) Mapping.transform("0100");
        }
        catch (Exception e) {
            throw new MappingException("An error occurred
    mapping the field "'+mappingToField.extName+'" .", e);
        }
        case AuthorisationResponse1110:
            return null;
        default:
            return null;
        }
    }
```

TABLE 2

The AuthorisationResponse1110ToAuthorisationResponseInvoker is used when an Authorization Response 1110 is mapped to Authorization Response.

```
/*** This class can be invoked for mapping Authentic
AuthorisationResponse1110 to Standard70
AuthorisationResponse*/
    public static class
AuthorisationResponse1110ToAuthorisationResponseInvoker
implements MapperInterface {
    protected Operation op = new
Operation(AuthenticMessage.MessageType.AuthorisationResponse
1110,
Standard70Message.MessageType.AuthorisationResponse);
    protected
AuthorisationResponse1110ToAuthorisationResponse in;
    @Override
    public void map(NormalisedMapperMessage src,
NormalisedMapperMessage dst) throws MappingException {
        AuthenticMessage srcMsg = new
AuthenticMessage(AuthenticMessage.MessageType.Authorisation
Response1110, src);
        Standard70Message dstMsg = new
Standard70Message(Standard70Message.MessageType.Authorisation
Response, dst);
        Map<Object, Object> sharedObject = new
HashMap<Object, Object>( );
        in.initialize(sharedObject, srcMsg, dstMsg);
        if(dst.getObject(DialIndicator.extName)==null) {
            dst.setObject(DialIndicator.extName, (Object)
in.mapToDialIndicator(sharedObject, op, DialIndicator,
srcMsg, dstMsg));
        }
        if(dst.getObject(TerminalIdentity.extName)==null)
{
            dst.setObject(TerminalIdentity.extName, (Object)
in.mapToTerminalIdentity(sharedObject, op,
TerminalIdentity, srcMsg, dstMsg));
        }
        if(dst.getObject(MessageNumber.extName)==null) {
            dst.setObject(MessageNumber.extName, (Object)
in.mapToMessageNumber(sharedObject, op, MessageNumber,
srcMsg, dstMsg));
        }
        if(dst.getObject(TerminalType.extName)==null) {
            dst.setObject(TerminalType.extName, (Object)
in.mapToTerminalType(sharedObject, op, TerminalType,
srcMsg, dstMsg));
        }
        if(dst.getObject(MessageType.extName)==null) {
            dst.setObject(MessageType.extName, (Object)
in.mapToMessageType(sharedObject, op, MessageType,
srcMsg, dstMsg));
```

TABLE 2-continued

The AuthorisationResponse1110ToAuthorisationResponseInvoker is used when an Authorization Response 1110 is mapped to Authorization Response.

```
        }
        if(dst.getObject(Body.extName)==null) {
            dst.setObject(Body.extName, (Object)
in.mapToBody(sharedObject, op, Body, srcMsg, dstMsg));
        }
```

TABLE 3

The Original Destination STAN returns a value of a field.

```
/**
    * Returns the value of field with name 'Original
Destination STAN'
    * applicable for messages:
    *       - AuthorisationRequest11001101
    *       - GenericMessage
    *       - AcquirerAdminAdvice16201621
    *       - ReversalAdviceRequest14201421
    *       - ReversalAdviceResponse1430
    *       - FinancialAdviceResponse1230
    *       - AdministrationRequest16041605
    *       - FormatErrorResponse9010
    *       - AdministrationResponse1614
    *       - PINChangeResponse9110
    *       - ReconciliationAdviceRequest1520
    *       - ReconciliationAdviceResponse1530
    *       - FinancialAdviceRequest12201221
    *       - FinancialRequest12001201
    *       - FinancialResponse1210
    *       - AdministrationAdviceRequest16241625
    *       - AdministrationAdviceResponse1634
    *       - AuthorisationResponse1110
    *       - AuthorizationAdviceRequest11201121
    *       - AuthorizationAdviceResponse1130
    *       - ReversalRequest14001401
    *       - ReversalResponse1410
    *       - ATMConfirmation1102
    */
    @Override
    public String getOriginalDestinationSTAN( ) {
        return (String) src.get("Original Destination
STAN");
    }
```

TABLE 4

The AuthenticMessage.java class is used to access the fields.

```
    * Class to access fields defined in Authentic message
AuthorisationRequest11001101
    */
    public class AuthorisationRequest11001101 {
    /**
        * Returns the value of field with name 'Message
Type'
        */
    public Integer getMessageType( ) {
        return (Integer) src.get("Message Type");
    }
    /**
        * Returns the value of field with name 'Transaction
Code'
        */
    public Integer getTransactionCode( ) {
        return (Integer) src.get("Transaction Code");
    }
    /**
        * Returns the value of field with name 'Transaction
Code Qualifier'
        */
    public String getTransactionCodeQualifier( ) {
```

TABLE 4-continued

The AuthenticMessage.java class is used to access the fields.

```
        return (String) src.get("Transaction Code
Qualifier");
    }
```

TABLE 5

The AuthorisationRequestValidator.java class is used to load the code to perform the validation.

```
/**
 * Interface to implement the validation of fields
 defined in Standard-70 message AuthorisationRequest
 */
public class AuthorisationRequestvalidator {
    private static AuthorisationRequest validator;
    static {
        try {
            String basePackage =
"com.ncr.authentic.messaging.apacs30.standard70.validation
.impl";
            ClassPathScanningCandidateComponentProvider
scanner = new
ClassPathScanningCandidateComponentProvider(false);
            scanner.addIncludeFilter(new
AssignableTypeFilter(AuthorisationRequest.class));
            set<BeanDefinition> candidates =
scanner.findCandidateComponents(basePackage);
            if(candidates!=null && !candidates.isEmpty( )) {
                for(BeanDefinition b: candidates) {
                    validator = (AuthorisationRequest)
Class.forName(b.getBeanClassName( )).newInstance( );
                    break;
                }
            }
        }
        catch (Throwable e) {
            TraceLog.Error(AuthorisationRequest.class, e);
        }
    }
    public static void validate(Standard70Message src)
throws ValidationException {
        LinkedList<ValidationException> exceptionList = new
LinkedList<ValidationException>( );
        Standard70Message.Standard70MessageFields
fieldToValidate = null;
        try {
            fieldToValidate =
Standard70Message.Standard70messageFields.DialIndicator;
            validator.validateDialIndicator(src,
fieldToValidate,
src.authorisationRequest.getDialIndicator( ));
        }
        catch (ValidationException e) {
            e.setFieldName(fieldToValidate.extName);
e.setFieldValue(src.authorisationRequest,getDialIndicator
( ));
e.setSrcmessageName(src.getstandard70messageType( ).name(
));
            e.setSrcInterfaceName("Standard70");
            exceptionList.add(e);
        }
```

Figure 6:
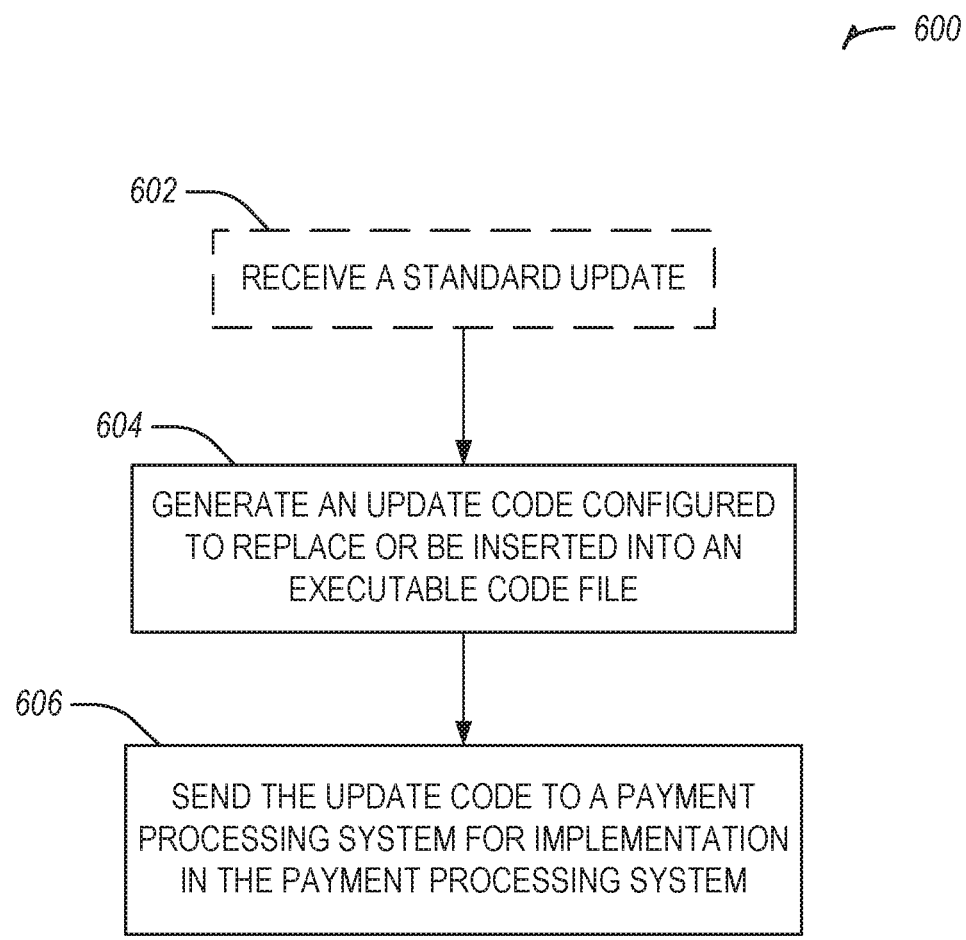
FIG. 6 illustrates generally a flowchart showing a technique for updating a payment system to conform with a standard in accordance with some embodiments.

FIG. 6 illustrates generally a flowchart showing a technique 600 for updating a payment processing system to conform with a standard in accordance with some embodiments. The technique 600 may include an operation 602 to receive (e.g., at an update system) a standard update, for example, from a payment acceptance system.

The technique 600 includes an operation 604 to generate an update code configured to replace or be inserted into an executable code file. The update code may replace a previous version of a standard corresponding to the standard update, for example, in the executable code file. In an example, the update code may include a validation code, for example to validate a financial transaction message. In an example, the update code includes mapping code to convert values in the financial transaction message to mapped values. The database may include a mapping rule, and the mapping code may be configured to be overridden by the mapping rule. The update code may be configured to parse the financial transaction message before validation.

The technique 600 includes an operation 606 to send the update code to a payment processing system for implementation in the payment processing system. The payment processing system may include the executable file. In an example, the payment processing system includes a database with a validation rule. The validation code of the update code may be configured to be overridden by the validation rule.

The update code may allow the payment processing system to send a payment in an updated configuration to the payment acceptance system. In an example, the update code includes validation code, which when executed, causes the payment processing system to determine whether a parsed message (e.g., the standard update may be received in a message and may be parsed) includes valid field values. The update code may include mapping code, which when executed, causes the payment processing system to convert field values from a parsed message (e.g., as described above) to mapped values.

The update code may be configured to run automatically on the payment processing system. In another example, the update code may be changed at the payment processing system to include customizations prior to running on the payment processing system. In an example, the update code is configured to, when executed, supplement a configuration customization of the payment processing system while avoiding overwriting the configuration customization of the payment processing system.

The payment processing system may include a database with custom validation rules or custom mapping rules. The update code may include validation code or mapping code. The validation code or the mapping code may be configured to be overridden by the custom validation rules or the custom mapping rules, respectively.

Figure 7:
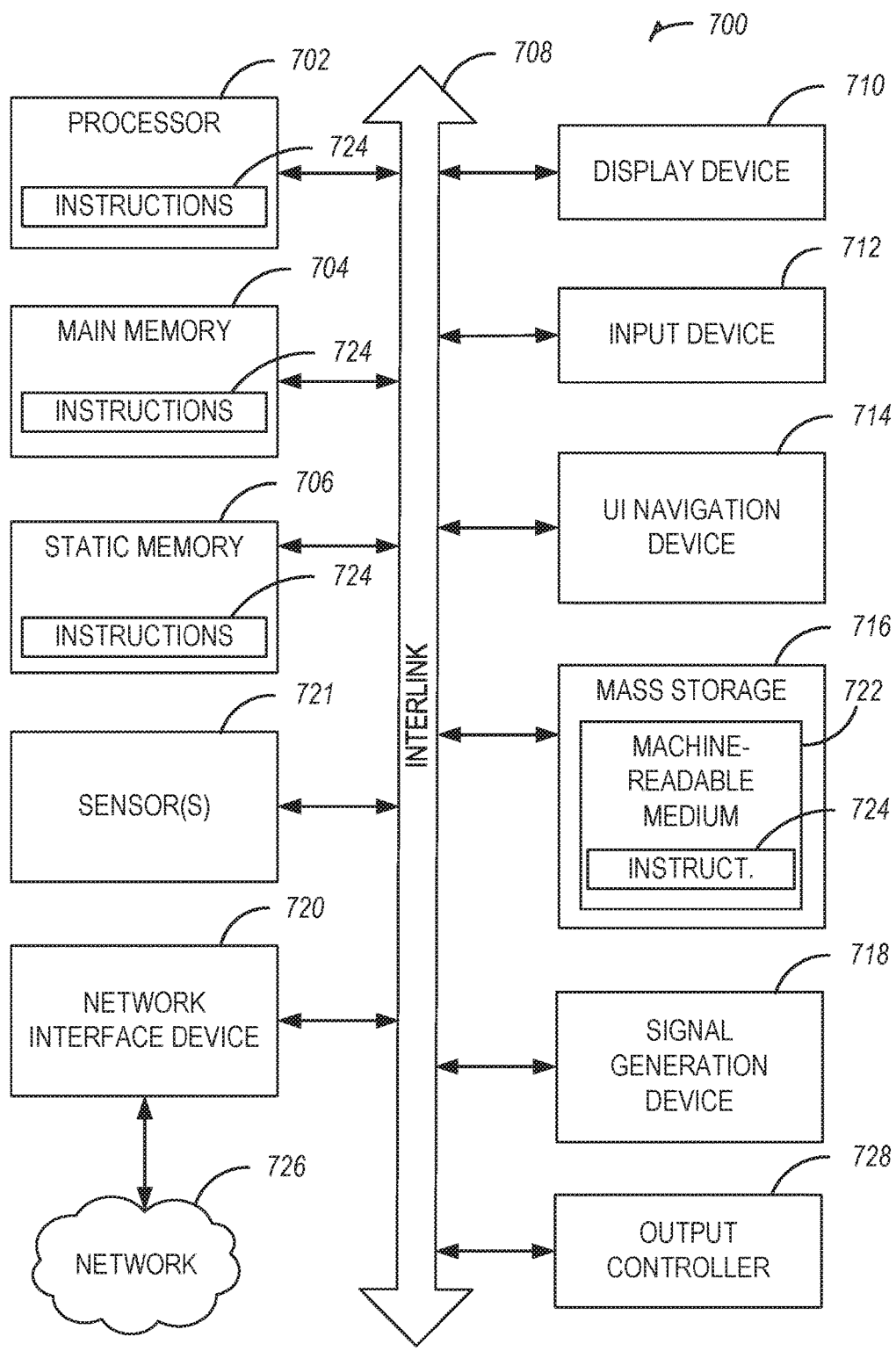
FIG. 7 illustrates generally an example of a block diagram of a machine upon which any one or more of the techniques discussed herein may perform in accordance with some embodiments.

FIG. 7 illustrates generally an example of a block diagram of a machine 700 upon which any one or more of the techniques discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, alphanumeric input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel or other wired or wireless (e.g., infrared (IR), near field communication (NFC), etc.) connection to communicate or control one or more peripheral devices (e.g., a printer, card reader, etc.).

The storage device 716 may include a machine readable medium 722 that is non-transitory on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Figure 8:
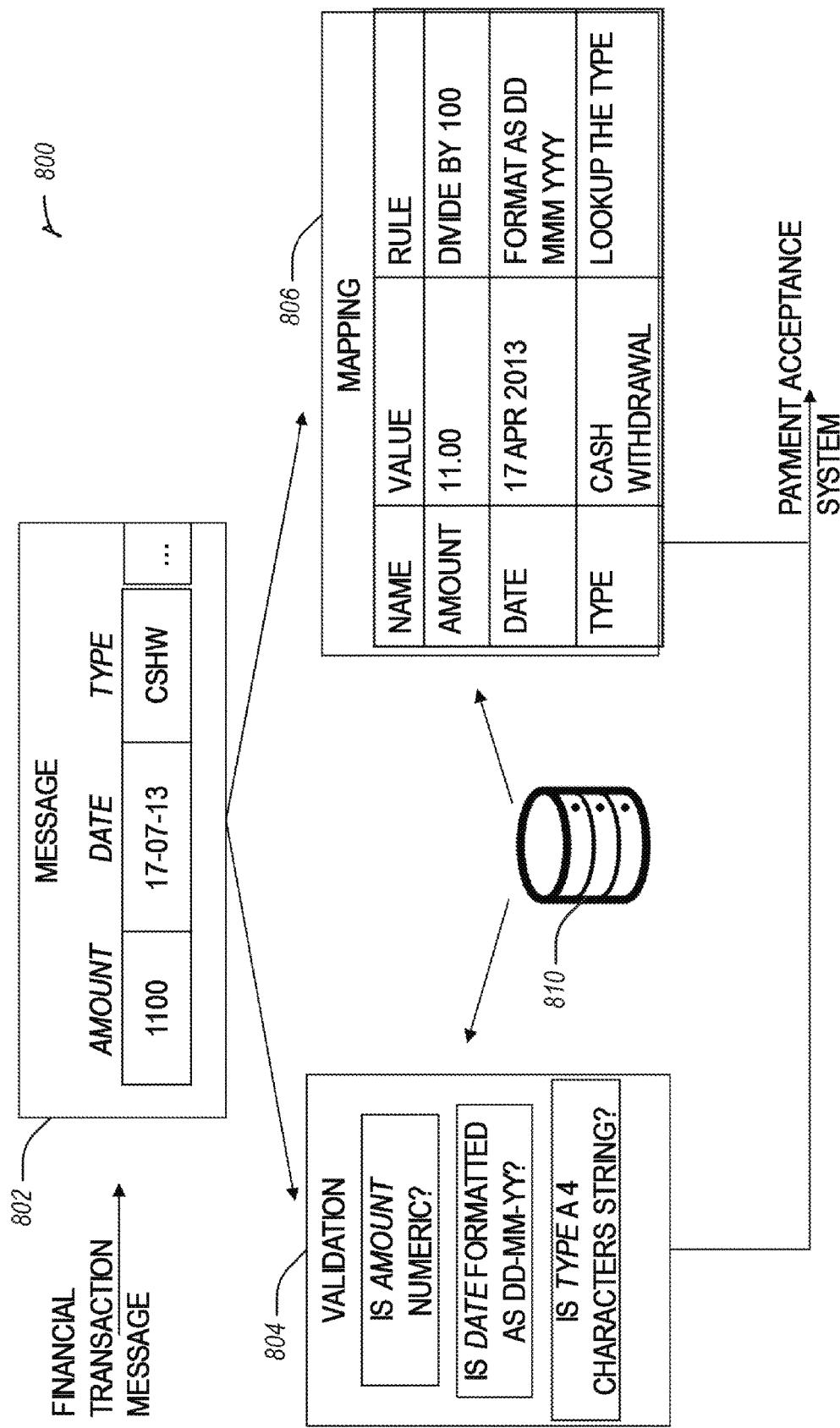
FIG. 8 illustrates generally a block diagram showing a transaction flow in accordance with some embodiments.

FIG. 8 illustrates generally a block diagram 800 showing a transaction flow in accordance with some embodiments. The block diagram 800 includes a message block 802, a validation block 804, and a mapping block 806. The message block 802 may illustrate a financial transaction message (e.g., received from a transaction device, such as a self-service terminal, an automated teller machine, etc.). The message block 802 illustrates information received in the financial transaction message, which may be in a raw format or a format configured according to the transaction device which has been parsed in the message block 802.

The validation block 804 illustrates validation rules or validation code, which verifies the parsed information in the message block 802. The validation block 804 may verify field values, such as amount, date, type, etc. In an example, the mapping block 806 may convert values in the parsed fields into mapped values, such as according to mapping rules or using mapping code. In an example, validation rules or mapping rules may be stored in a database 810. In another example, validation code or mapping code may be run by a payment processing system to perform validation or mapping. After validation or mapping is completed, an output message may be sent to a payment acceptance system to process the transaction. The output message may be output according to a standard, which may be updated from update code received from an update system by the payment processing system.

For example, a customer at an ATM may perform a cash withdrawal. A message is sent from the ATM to a payment processing system, for example, in binary form. Using rules in a configuration database, the payment processing system parses the message into its constituent fields (e.g., Amount, Date, Type, etc.). Using configuration information from the database, the payment processing system may validate each of the fields. Using mapping configuration information from the database, the payment processing system may transform the data from one format to another. In another example, the payment processing system may use a received update code to validate or map the parsed message. When the message is to be sent to a payment acceptance system (e.g., a card issuer) for authentication and authorization, the message may be transformed to meet an external message format (e.g., the external message format may be established according to a standard update, for example from the payment acceptance system) using the mapping and formatting rules in the database configuration information or in the update code.

Figure 9:
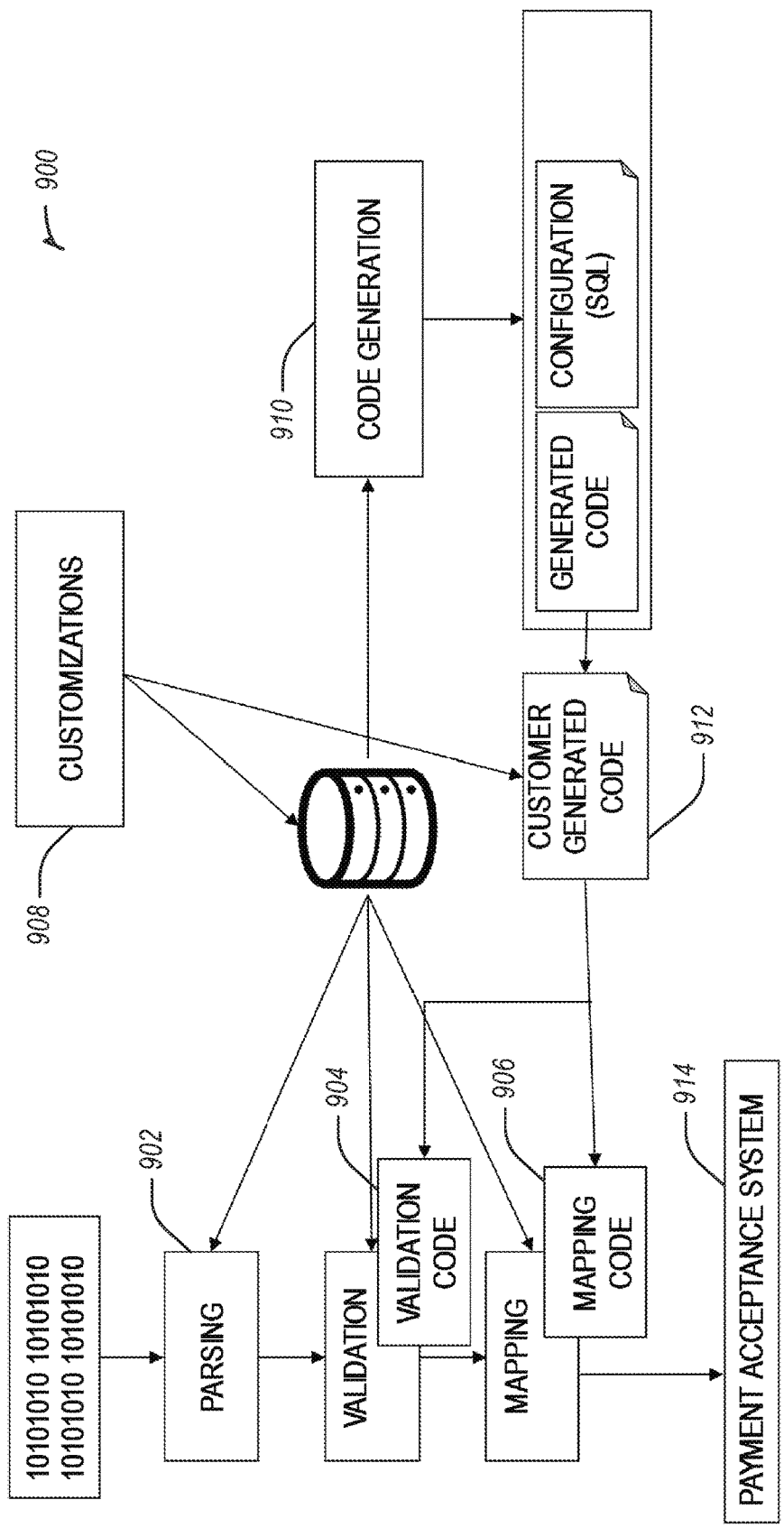
FIG. 9 illustrates generally a block diagram showing mapping and validation including a customer created configuration and code in accordance with some embodiments.

FIG. 9 illustrates generally a block diagram 900 showing mapping and validation including a customer created configuration and code in accordance with some embodiments. The block diagram 900 includes a parsing block 902 to parse a message (e.g., a binary file received for a financial transaction). The block diagram 900 includes validation code block 904 and a mapping code block 906, either of which may be created by an update from an update system or by a customer (e.g., at customization block 908). A code generation block 910 may generate code based on an updated code received from an update system. The customizations generated at customization block 908 may be used to modify the code generated at block 910 to generate customer code at block 912. The generated code at block 912 may be used to run the parsing, validation, or mapping. After parsing, validation, and mapping, an output message may be sent to a payment acceptance system 914 to process a transaction.

In an example, a customer may create validation or mapping rules in a database. The customer-created rules and may conflict with the generated code validation code or mapping code. In an example, rules that the customer has created may take precedence over the standard product delivered code. The customer may replace the generated code with a custom copy including the validation and mapping code (e.g., through code inheritance). In an example, customer changes may override the standard delivered code. Inheritance allows the customer the opportunity to override the delivered code. When the customer chooses to retain the original product delivered code, then the standard delivered code is be used; otherwise the customer's override code is be used.

Various Notes & Examples

Each of these non-limiting examples may stand on its own, or may be combined in various permutations or combinations with one or more of the other examples.

Example 1 is a method for updating a configuration data structure to conform with a standard, the method comprising: receiving a standard update; generating, using information from the standard update, an update code, which is configured to be insertable into an executable code file, the update code replacing a previous version of a standard corresponding to the standard update in the executable code file; and sending the update code in a configuration code file to a payment processing system for implementation in the payment processing system, the payment processing system including the executable code file.

In Example 2, the subject matter of Example 1 optionally includes wherein the update code includes validation code, which when executed, causes the payment processing system to determine whether a parsed message includes valid field values.

In Example 3, the subject matter of any one or more of Examples 1-2 optionally include wherein the update code includes mapping code, which when executed, causes the payment processing system to convert field values from a parsed message to mapped values.

In Example 4, the subject matter of any one or more of Examples 1-3 optionally include wherein the update code is configured to run automatically on the payment processing system.

In Example 5, the subject matter of any one or more of Examples 1-4 optionally include wherein the update code is changed at the payment processing system to include customizations prior to running on the payment processing system.

In Example 6, the subject matter of any one or more of Examples 1-5 optionally include wherein the update code is configured to, when executed, supplement a configuration customization of the payment processing system while avoiding overwriting the configuration customization of the payment processing system.

In Example 7, the subject matter of any one or more of Examples 1-6 optionally include wherein receiving the standard update includes receiving the standard update from a payment acceptance system and wherein the update code allows the payment processing system to send a payment in an updated configuration to the payment acceptance system.

In Example 8, the subject matter of any one or more of Examples 1-7 optionally include wherein the payment processing system includes a database with custom validation rules and custom mapping rules, and wherein the update code includes validation code and mapping code, wherein the validation code and the mapping code are configured to be overridden by the custom validation rules and the custom mapping rules, respectively.

Example 9 is a method comprising: generating an update code including validation code to validate a financial transaction message, the update code configured to replace an executable code file; and sending the update code in a configuration code file to a payment processing system for implementation in the payment processing system, the payment processing system including a database with a validation rule, the validation code configured to be overridden by the validation rule.

In Example 10, the subject matter of Example 9 optionally includes wherein the update code includes mapping code to convert values in the financial transaction message to mapped values.

In Example 11, the subject matter of Example 10 optionally includes wherein the database includes a mapping rule, and wherein the mapping code is configured to be overridden by the mapping rule.

In Example 12, the subject matter of any one or more of Examples 9-11 optionally include wherein the update code is configured to parse the financial transaction message before validation.

In Example 13, the subject matter of any one or more of Examples 9-12 optionally include wherein the update code allows the payment processing system to send a payment in an updated configuration to a payment acceptance system.

Example 14 is a payment processing update system for updating a configuration data structure to conform with a standard, the system comprising: at least one processor; a storage device comprising instructions, which when executed on the at least one processor, configure the at least one processor to: receive a standard update in a first format; generate, using information from the standard update, an update code, which is configured to be insertable into an executable code file, the update code replacing a previous version of a standard corresponding to the standard update in the executable code file; and send the update code in a configuration code file to a payment processing system for implementation in the payment processing system, the payment processing system including the executable code file.

In Example 15, the subject matter of Example 14 optionally includes wherein the update code includes validation code, which when executed, causes the payment processing system to determine whether a parsed message includes valid field values.

In Example 16, the subject matter of any one or more of Examples 14-15 optionally include wherein the update code includes mapping code, which when executed, causes the payment processing system to convert field values from a parsed message to mapped values.

In Example 17, the subject matter of any one or more of Examples 14-16 optionally include wherein the update code is configured to run automatically on the payment processing system.

In Example 18, the subject matter of any one or more of Examples 14-17 optionally include wherein the update code is changed at the payment processing system to include customizations prior to running on the payment processing system.

In Example 19, the subject matter of any one or more of Examples 14-18 optionally include wherein to receive the standard update, the processor is to receive the standard update from a payment acceptance system and wherein the update code allows the payment processing system to send a payment in an updated configuration to the payment acceptance system.

In Example 20, the subject matter of any one or more of Examples 14-19 optionally include wherein the payment processing system includes a database with custom validation rules and custom mapping rules, and wherein the update code includes validation code and mapping code, wherein the validation code and the mapping code are configured to be overridden by the custom validation rules and the custom mapping rules, respectively.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for updating a configuration data structure to conform with a standard, the method comprising:

receiving a standard update;
generating, using information from the standard update, an update code, which is configured to be insertable into an executable code file, wherein the update code replaces a previous version of a standard corresponding to the standard update in the executable code file; and
sending the update code in a configuration code file to a payment processing system for implementation in the payment processing system, wherein the payment processing system includes the executable code file, wherein the payment processing system includes a database with custom validation rules and custom mapping rules, wherein the update code includes validation code and mapping code, and wherein the validation code and the mapping code are configured to be overridden by the custom validation rules and the custom mapping rules, respectively.

2. The method of claim 1, wherein the validation code, which when executed, causes the payment processing system to determine whether a parsed message includes valid field values.

3. The method of claim 1, wherein the mapping code, which when executed, causes the payment processing system to convert field values from a parsed message to mapped values.

4. The method of claim 1, wherein the update code is configured to run automatically on the payment processing system.

5. The method of claim 1, wherein the update code is changed at the payment processing system to include customizations prior to running on the payment processing system.

6. The method of claim 1, wherein the update code is configured to, when executed, supplement a configuration customization of the payment processing system while avoiding overwriting the configuration customization of the payment processing system.

7. The method of claim 1, wherein receiving the standard update includes receiving the standard update from a payment acceptance system, and wherein the update code allows the payment processing system to send a payment in an updated configuration to the payment acceptance system.

8. A method comprising:

generating, using information from a standard update, an update code including validation code to validate a financial transaction message and mapping code to convert values in the financial transaction message to mapped values, wherein the update code is configured to replace an executable code file; and
sending the update code in a configuration code file to a payment processing system for implementation in the payment processing system, wherein the payment processing system includes the executable code file, wherein the payment processing system includes a database with a custom validation rule and a custom mapping rule, wherein the validation code is configured to be overridden by the custom validation rule, and wherein the mapping code is configured to be overridden by the custom mapping rule.

9. The method of claim 8, wherein the update code is configured to parse the financial transaction message before validation.

10. The method of claim 8, wherein the update code allows the payment processing system to send a payment in an updated configuration to a payment acceptance system.

11. A payment processing update system for updating a configuration data structure to conform with a standard, the payment processing update system comprising:

at least one processor; and a memory storing instructions, which when executed on the at least one processor, configure the at least one processor to:

receive a standard update;

generate, using information from the standard update, an update code, which is configured to be insertable into an executable code file, wherein the update code replaces a previous version of a standard corresponding to the standard update in the executable code file; and send the update code in a configuration code file to a payment processing system for implementation in the payment processing system, wherein the payment processing system includes the executable code file, wherein the payment processing system includes a database with custom validation rules and custom mapping rules, wherein the update code includes validation code and mapping code, and wherein the validation code and the mapping code are configured to be overridden by the custom validation rules and the custom mapping rules, respectively.

12. The payment processing update system of claim 11, wherein the validation code, which when executed, causes the payment processing system to determine whether a parsed message includes valid field values.

13. The payment processing update system of claim 11, wherein the mapping code, which when executed, causes the payment processing system to convert field values from a parsed message to mapped values.

14. The payment processing update system of claim 11, wherein the update code is configured to run automatically on the payment processing system.

15. The payment processing update system of claim 11, wherein the update code is changed at the payment processing system to include customizations prior to running on the payment processing system.

16. The payment processing update system of claim 11, wherein to receive the standard update, the at least one processor is to receive the standard update from a payment acceptance system, and wherein the update code allows the payment processing system to send a payment in an updated configuration to the payment acceptance system.

* * * * *